Sept. 13, 1949.                    R. LAPPS                      2,481,848
                               JUICE EXTRACTOR
Filed Oct. 25, 1946                                        2 Sheets-Sheet 1
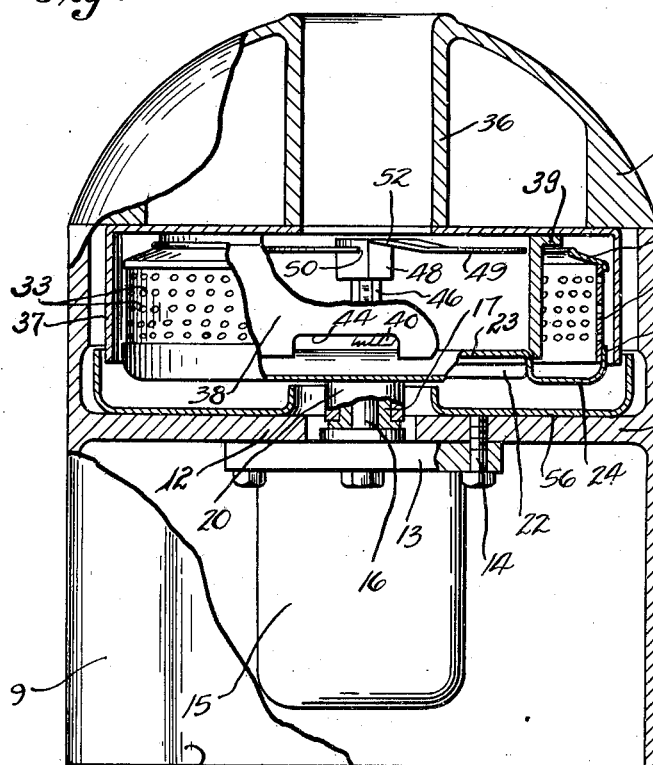
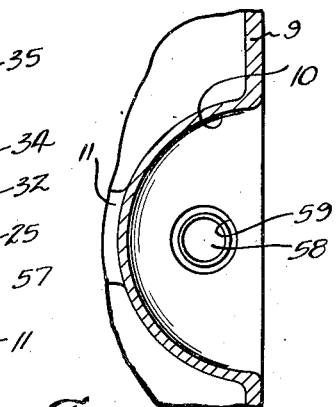
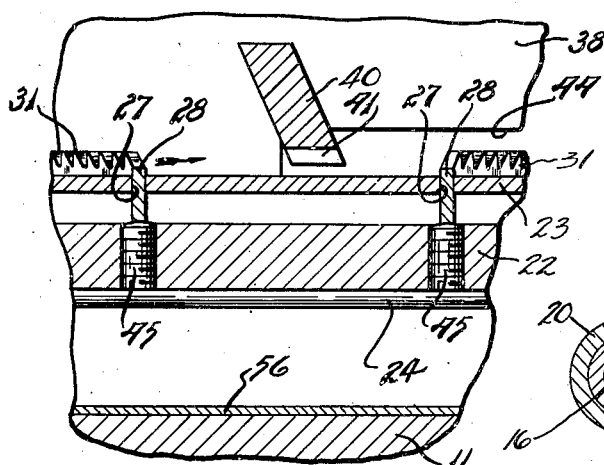
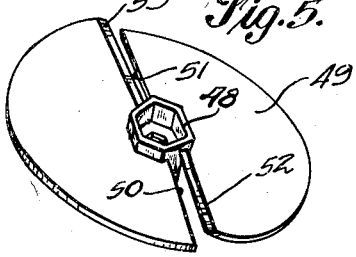
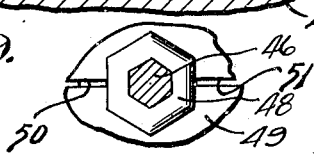
INVENTOR.
RUDOLPH LAPPS.
BY
ATTORNEY Sept. 13, 1949.   R. LAPPS   2,481,848
JUICE EXTRACTOR
Filed Oct. 25, 1946   2 Sheets-Sheet 2

INVENTOR
RUDOLPH LAPPS.
BY Thos. Donnelly
ATTORNEY

Patented Sept. 13, 1949

2,481,848

UNITED STATES PATENT OFFICE 2,481,848

JUICE EXTRACTOR

Rudolph Lapps, Detroit, Mich.

Application October 25, 1946, Serial No. 705,511

6 Claims. (Cl. 146—76)

My invention relates to a new and useful improvement in a juice extracting machine adapted for use in extracting juices from vegetables and fruits such as carrots, beets, celery, apples, pears, rhubarb, spinach, cabbage and the like.

It is an object of the present invention to provide in a machine of this class of means for cutting the article operated upon into thin slices, then subjecting the slices to a pulpifying action and then subjecting the pulp to a centrifugal action for extracting the juices or liquid matter therefrom.

It is another object of the invention to provide, in a machine of this class, a rotating pulpifying member adapted for cooperation with a stationary member.

Another object of the invention is the provision in a machine of this class of a mechanism whereby juice may be extracted from pulpless material such as pears, peaches and the like while, at the same time, fibrous articles as celery, rhubarb may be acted upon with a high degree of efficiency.

Another object of the invention is the provision of a machine of this class whereby the juice may be extracted from leafy articles such as cabbage, spinach, etc.

Another object of the invention is the provision in a device of this class of a cover carrying the cutting mechanism and so arranged and constructed with other mechanism that when the cover is removed the rotation of the pulpifying member cannot be effected.

Another object of the invention is the provision in a device of this class of a deflecting wall for deflecting the centrifuged juices so that they will pass downwardly into a receiving chamber or pan.

Another object of the invention is the provision in a machine of this class of a construction which will be durable, compact, economically manufactured and highly efficient in use.

Other objects will appear hereinafter.

It is recognized that various modifications and changes may be made in the detail of structure illustrated without departing from the invention and it is intended that such shall be embraced within the scope of the claims which form a part hereof.

Figure 2:
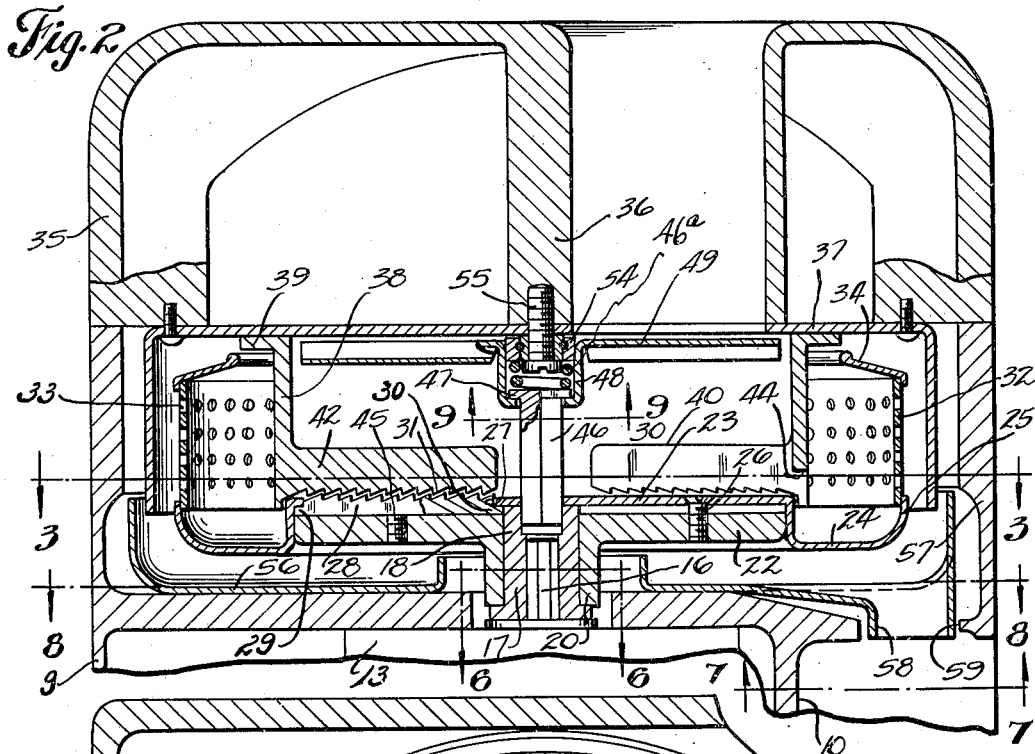
Figure 3:
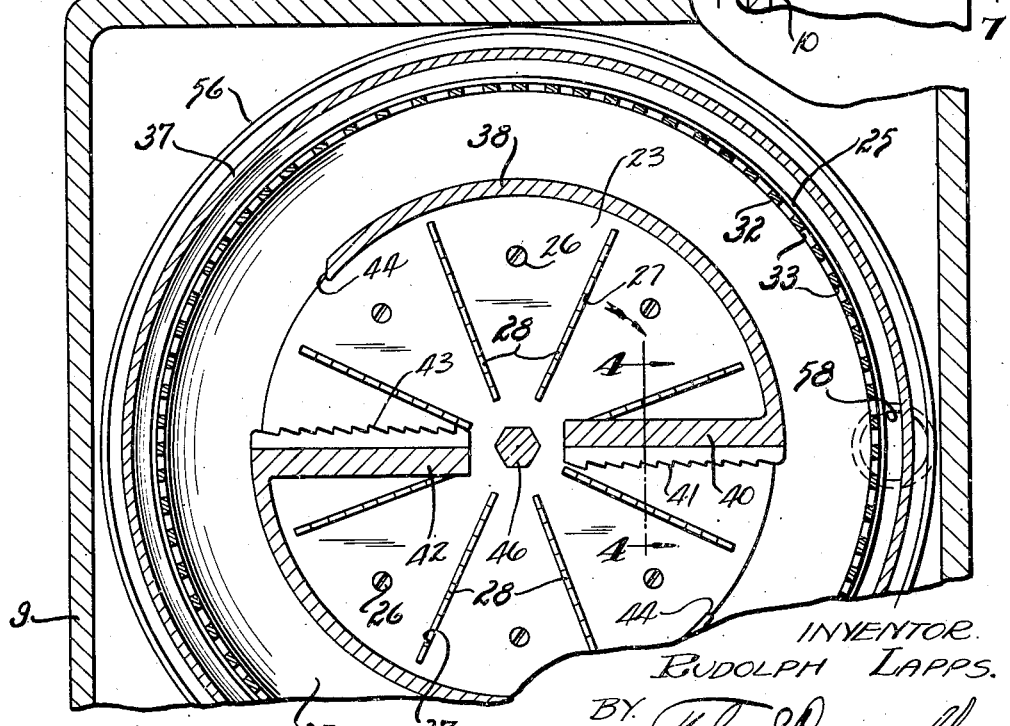

Forming a part of the specification are drawings in which,

Fig. 1 is a side elevational view of the invention with parts broken away and parts shown in section, Fig. 2 is a fragmentary central, vertical, sectional view of the invention, Fig. 3 is a fragmentary view taken on line 3—3 of Fig. 2, Fig. 4 is an enlarged fragmentary sectional view taken on line 4—4 of Fig. 3, Fig. 5 is a perspective view of the cutting element used in the invention, Fig. 6 is a sectional view taken on line 6—6 of Fig. 2, Fig. 7 is a fragmentary sectional view taken on line 7—7 of Fig. 2, Fig. 8 is a sectional view reduced in size taken on line 8—8 of Fig. 2, Fig. 9 is a sectional view taken on line 9—9 of Fig. 2.

As shown in the drawing the invention comprises a housing or base 9 having a pocket 10 formed in one side to provide a recess in which a glass or other receptacle may be positioned. Extending inwardly from the wall of the housing or base 9 are ribs 11 connecting at the center with a hub forming plate 12 to which is attached, by means of the bolts 14, the flange 13 of an electric motor 15 having the shaft 16 projecting upwardly therefrom and extending into the bushing 17, the bore through the bushing 17, being provided with a flat face to engage the flat face of the shaft 16 so that the bushing 17 will rotate in unison with the shaft 16. The bushing 17 projects through the neck 20 which depends from the plate 22. Secured to the plate 22 by means of the screws 26, is the bottom 23 of a pan, the bottom being inwardly upset to provide the marginal portion 24 positioned below the plane of the inset portion 23 of the bottom. A marginal flange 25 is turned upwardly and welded or otherwise suitably secured to the lower edge of the wall 32 which is provided with openings 33 formed therein.

A bottom 23 is provided with a plurality of circumferentially spaced apart radially directed slots 27 and projecting through these slots 27 is one edge of the blades 28 having the saw teeth 31 formed on the edge which projects through the slots 27. These blades are provided at opposite ends with the lugs 29 and 30 which lie beneath the bottom face of the bottom 23 and which are held at proper position relatively to the bottom 23 by the screws 45 threaded through the plate 22. By threading these screws inwardly or outwardly, the distance which the teeth 31 project above the inner face of the bottom 23 may be varied. In this way, a close mesh or a loose mesh between the teeth 31 and the teeth 41 and 43, which are to be described later, may be obtained. The closer these teeth mesh, the finer will be the particles produced and proper balance.

Welded, or otherwise suitably secured to the upper edge of the wall 32 is the inwardly directed inclined flange 34 which serves as a means for preventing the pulp from being thrown upwardly and outwardly from the receptacle which is formed by the wall 32 and the bottom 23.

A cover 35 is adapted for being positioned on top of the housing or base 9. This cover 35 is provided with the downwardly directed chute 36 through which the material to be operated upon may be passed. Secured to the face of the cover 35 in inverted position is the pan 37 in such a position as to embrace the receptacle having the perforated wall and be retained stationary in spaced relation thereto. It will be noted that the lower edge of the pan 37 extends beyond the upper edge of the basin 56 which is positioned to sit upon the spider formed by the members 11 and 12. An annular member 38 is provided with the outwardly directed flange 39 which is secured to the inner face of the pan 37 so that the wall 38 depends therefrom. Projecting inwardly from the wall 37 at substantially diametrically opposite sides, are the arms 40 and 42 which are inclined to the vertical and each of which has on its lower edge a plurality of saw teeth 41 and 43 respectively adapted to intermesh with the teeth 31 upon a rotation of these blades 28. The incline is in the direction of rotation to provide an engagement pocket for the particles of material operated upon.

A driving shaft 46, which is provided with flat sides is adapted for insertion into the bushing 17 so that upon operation of the motor 15 the shaft 46 will be rotated. This shaft 46 is provided with a head or flange 47 which has flat sides and which is positioned in a housing 48 which is also provided with flat sides so that there can be no relative rotation between the shaft 46 and the member 48. This member 48 is formed integral with the disc 49 which is radially slitted as at 50 and 51. This disc is off-set at one side of each of the slits to provide an off-set cutting blade 52 and 53. The housing 48 is rotated on a bearing 54 which is held in position by the bolt 55 threaded into the wall of the chute 36.

When the cover 35 is positioned as shown in Fig. 2, and vegetables such as carrots, celery, spinach, or fruit such as apples, pears, or the like, are dropped or forced downwardly of the chute 36 the cutting element will be rotating when the motor 15 is operating. The receptacle with the perforated wall will also be rotating. As these articles are engaged by the cutting element, thin slices will be sliced from the article and dropped downwardly onto the bottom 23 by which they will be carried by the blades 28 into engagement with the teeth on the arms 40 and 42. Experience has shown that it is not necessary to force the material downwardly in the chute 36, as the articles will feed down by gravity to contact the cutting element. The blade will serve to draw the materials inwardly, due to the inclined position of the cutting edge portion. The cutting blades will rotate clockwise and, from an examination of Fig. 3, it will be obvious that the cut off slice will be brought into the pockets formed by the members 40 and 42 and the base 23 and brought into engagement with the teeth 41 and 43 on the members 40 and 42. The wall 38 is cut away at its lower edge as at 44 at the far side of each of the arms 40 and 42. Consequently, this slice of material, which is brought into engagement with the teeth on the arm 40, will be pulpified and thrown out by centrifugal action through the space provided at the cut away portion 44. That which is not thrown out will be carried by the blades into engagement with the teeth 43 on the arm 42 where it will be further pulpified and then thrown outwardly through the space at the cut away portion 44. The pulpified material is then subjected to centrifugal action by the spinning receptacle which has the perforated wall 32, the pulp being retained by this wall 32, the openings 33 being of sufficient size for permitting passage of the liquids therethrough. The liquid passing through the openings 33 will strike against the inner wall of the pan 37 and then drop downwardly into the catch basin 56. This catch basin 56 is provided with the outlet spout 58 which extends through the opening 59 formed in one of the legs 11 so that the liquid may be collected by a glass or other receptacle positioned in the recess 10.

When the cover 35 is removed the operation of the motor 15 will not effect a rotation of the plate 22, for it will be noted that the driving connection of plate 22 is through its securement to base 23 which is provided with a flat sided opening for engagement with the flat sided shaft 46, that projects therethrough. When disassembling for cleaning the cover 35, blade 49, together with shaft 46, are removed and should the operator desire to clean or remove the pulp from the sides of wall 32 without its removal from the machine, he may do so without fear of injury should the motor start up, as there would only be slippage between bushing 17 and neck 20 of plate 22. The fit between bushing 17 and neck 20 is such as to allow ready removal for cleaning of cutting blades 25, plate 22, base 23, walls 32, and 24 as a unitary structure.

The spring 46a serves to resist upward movement of the shaft or stud 46 when the machine is operating.

What I claim as new is:

1. A machine of the class described, comprising: a housing; a receptacle mounted in said housing and adapted for rotation, said receptacle having a perforated wall; a cover for said housing; an inverted pan carried by said cover and adapted upon mounting of said cover on said housing for projecting inwardly of said housing and embracing, in spaced relation, said receptacle, the walls of said pan being imperforate; a chute formed on said cover and extending therethrough for projection of materials therethrough into said receptacle; a rotatable cutting element carried by said cover on the inner side thereof and adapted for rotation across said chute for cutting slices from materials projected through said chute for depositing the same in said receptacle; a shaft carried by said cover and projecting into and engaging with said receptacle and adapted upon rotation for rotating said receptacle and said cutting element; an electric motor; and the means driven by said motor for effecting a rotation of said shaft.

2. A machine of the class described, comprising: a housing; a receptacle mounted in said housing and adapted for rotation, said receptacle having a perforated wall; a cover for said housing; an inverted pan carried by said cover and adapted upon mounting of said cover on said housing for projecting inwardly of said housing and embracing, in spaced relation, said receptacle, the walls of said pan being imperforate; a chute formed on said cover and extending therethrough for projection of materials therethrough into said receptacle; a rotatable cutting element carried by said cover on the inner side thereof and adapted for rotation across said chute for cutting slices from materials projected through said chute for depositing the same in said receptacle; a shaft carried by said cover and projecting into and engaging with said receptacle and adapted upon rotation for rotating said receptacle and said cutting element; an electric motor; and means driven by said motor for effecting a rotation of said shaft; pulpifying means carried by and rotatable in unison with said receptacle; and pulpifying means carried by said cover and projecting into said receptacle and adapted for co-operating with the pulpifying means on said receptacle for pulpifying material deposited in said receptacle, the rotation of said receptacle effecting a centrifuging of juices from the pulpified material through the perforations in said receptacle.

3. In a machine of the class described, a housing; a receptacle mounted in said housing and adapted for rotation and having a perforated wall; a cover for said housing; a chute for depositing materials in said receptacle; an annular member carried by said cover and projecting inwardly of said receptacle; arms projecting radially inwardly from the inner face of said annular member and terminating outwardly from the center thereof, said annular member being cut away at its lower edge at one side of each of said arms; and pulpifying means carried by and rotatable in unison with said receptacle for co-operating with said arms for pulpifying materials deposited in said receptacle; and a cutting element mounted to sweep across the inner end of said chute for slicing material projected through said chute and depositing the same in said receptacle.

4. In a machine of the class described, a housing; a receptacle mounted in said housing and adapted for rotation and having a perforated wall; a cover for said housing; a chute for depositing materials in said receptacle; an annular member carried by said cover and projecting inwardly of said receptacle; arms projecting radially inwardly from the inner face of said annular member and terminating outwardly from the center thereof, said annular member being cut away at its lower edge at one side of each of said arms; and pulpifying means carried by and rotatable in unison with said receptacle for co-operating with said arms for pulpifying materials deposited in said receptacle; and a cutting element mounted to sweep across the inner end of said chute for slicing material projected through said chute and depositing the same in said receptacle; and the means for rotating said cutting element and said receptacle.

5. In a machine of the class described, a housing; a receptacle mounted in said housing and adapted for rotation and having a perforated wall; a cover for said housing; a chute for depositing materials in said receptacle; an annular member carried by said cover and projecting inwardly of said receptacle; arms projecting radially inwardly from the inner face of said annular member and terminating outwardly from the center thereof, said annular member being cut away at its lower edge at one side of each of said arms; and pulpifying means carried by and rotatable in unison with said receptacle for co-operating with said arms for pulpifying materials deposited in said receptacle and a cutting element mounted to sweep across the inner end of said chute for slicing material projected through said chute and depositing the same in said receptacle; and the means for rotating said cutting element and said receptacle; and the means exterior of said receptacle for deflecting liquids centrifuged therethrough.

6. In a machine of the class described, a housing; a receptacle mounted in said housing and adapted for rotation and having a perforated wall; a cover for said housing; a chute for depositing materials in said receptacle; an annular member carried by said cover and projecting inwardly of said receptacle; arms projecting radially inwardly from the inner face of said annular member and terminating outwardly from the center thereof, said annular member being cut away at its lower edge at one side of each of said arms; and pulpifying means carried by and rotatable in unison with said receptacle for co-operating with said arms for pulpifying materials deposited in said receptacle and a cutting element mounted to sweep across the inner end of said chute for slicing material projected through said chute and depositing the same in said receptacle; and the means for rotating said cutting element and said receptacle; and the means exterior of said receptacle for deflecting liquid centrifuged therethrough; and a catch basin for collecting liquids deflected by said deflecting member.

RUDOLPH LAPPS.

REFERENCES CITED

The following references are of record in the file of this patent:

UNITED STATES PATENTS

| Number | Name | Date |
|---|---|---|
| 1,964,437 | Klein | June 26, 1934 |
| 2,227,098 | MacLean | Dec. 31, 1940 |
| 2,255,764 | Drachenberg | Sept. 16, 1941 |
| 2,267,048 | Schwarz | Dec. 23, 1941 |
| 2,273,093 | Drachenberg | Feb. 17, 1942 |
| 2,297,880 | Fredrickson | Oct. 6, 1942 |
| 2,304,929 | Keith | Dec. 15, 1942 |
| 2,311,379 | Gillanders | Feb. 16, 1943 |
| 2,314,206 | Grau | Mar. 16, 1943 |
| 2,369,406 | Reynolds | Feb. 13, 1945 |
| 2,409,497 | Kessel | Oct. 15, 1946 |